United States Patent Office 3,337,188
Patented Aug. 22, 1967

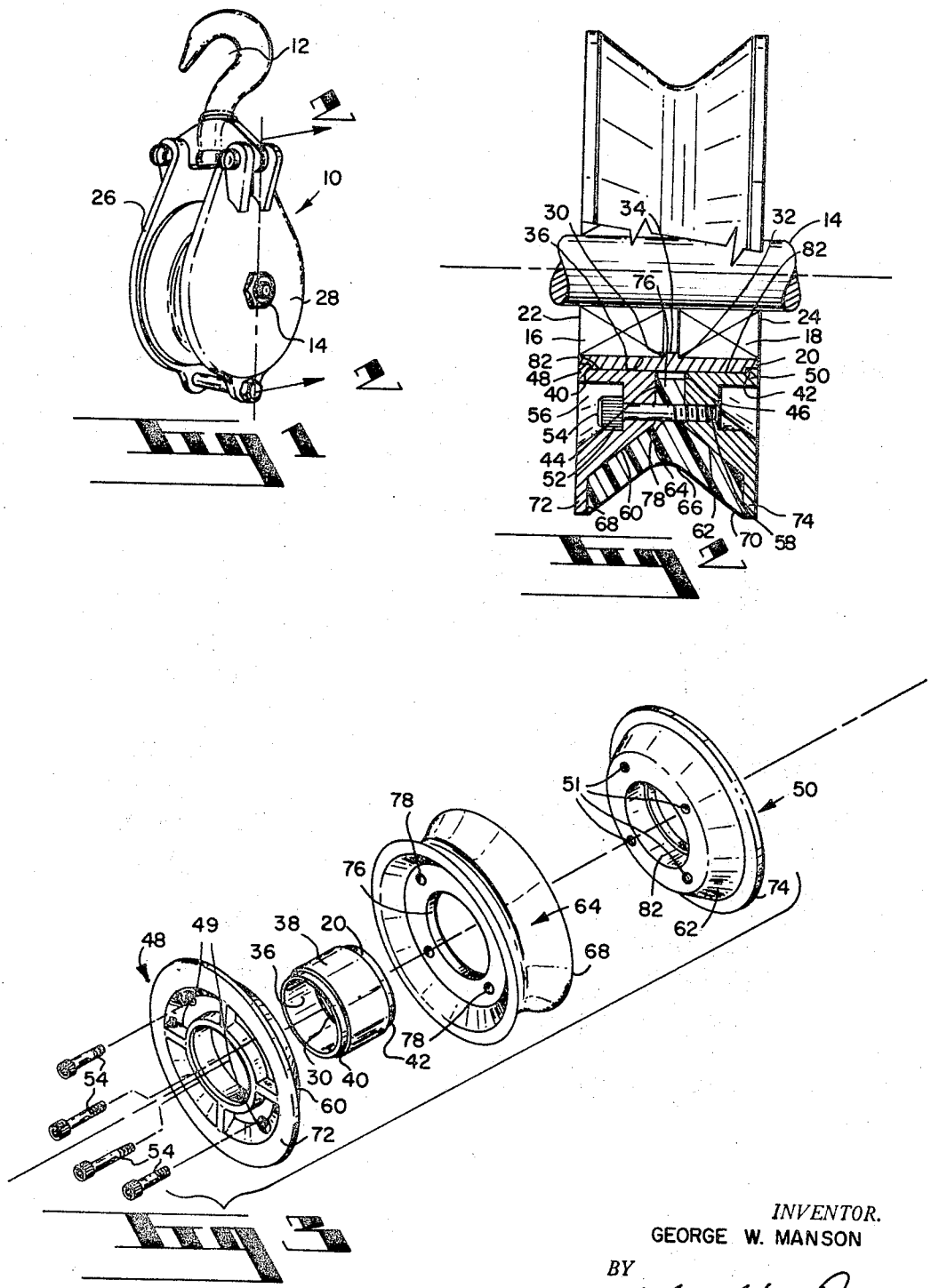

3,337,188
SHEAVE CONSTRUCTION
George W. Manson, 4864 Lafayette Blvd.,
Phoenix, Ariz. 85018
Filed May 23, 1966, Ser. No. 552,064
2 Claims. (Cl. 254—192)

ABSTRACT OF THE DISCLOSURE

A sheave construction having a pair of separable sheave portions holding a substantially annular V-shaped in cross-section cable engaging sheave member in position to engage a cable, said last mentioned member being of a relatively soft material, as compared to a cable to be engaged thereby so as to provide a long wearing sheave.

---

This invention relates to a sheave construction, and more particularly, to a sheave construction, wherein novel means is provided for replacing the grooved structure of sheaves which tend to wear out and, also, to provide a replaceable grooved sheave structure having high resistance to wear from cables, ropes or other means which may pass over the sheave structure.

Heretofore, sheave assemblies have been costly to maintain, since the peripheral grooved portion of sheaves tend to wear progressively, as cable traverses these peripheral grooves and conventional sheave assemblies are generally discarded, when such wear occurs. Further, most of these sheave structures are provided with a peripheral groove portion made of cast iron or other similar material, which tends to readily wear in contact with braided steel cable, or the like.

Accordingly, it is an object of the present invention to provide a novel sheave construction having a replaceable annular grooved sheave element.

Another object of the invention is to provide a novel sheave construction having a replaceable annular grooved sheave element which is of very tough wear resistant material tending to attain long life when in contact with conventional steel cable, or the like.

Another object of the invention is to provide a novel sheave construction having a replaceable sheave groove structure and novel means for clamping the replaceable grooved structure in connection with a central bearing support sleeve.

Another object of the invention is to provide a sheave construction having a replaceable annular groove structure which may very readily and easily be replaced with a minimum of time and effort.

Another object of the invention is to provide a novel sheave construction which is very simple and economical of construction, efficient and durable.

Another object of the invention is to provide a sheave construction composed of a combination of novel materials which are adapted to reduce the weight and inertia of the sheave construction, as well as to provide a replaceable sheave groove structure of high wear resistance material.

Other objects and advantages of the invention may be apparent from the following specification, appended claims and accompanying drawings, in which:

FIG. 1 is a perspective view of a conventional sheave block, showing the sheave construction of the invention mounted therein;

FIG. 2 is an enlarged peripheral elevational view of sheave construction in accordance with the present invention and showing portions of the structure broken away and in section to amplify the illustration; and FIG. 3 is an exploded view of the structure shown in FIG. 2 and illustrated on a reduced scale.

A conventional sheave block structure 10, as shown in FIG. 1 of the drawings, may be mounted by a conventional swivel hook 12 or the block 10 may be mounted in any suitable manner, as desired. An axle 14 is normally used to mount sheaves where they are mounted in a block 10 or on fixed brackets or otherwise.

The axle 14, as shown in FIG. 2 of the drawings, is supported in bearings 16 and 18 in a hollow cylindrical bearing holding member 20 of the invention.

The bearings 16 and 18 may be bushings, they may be pre-loaded double row ball bearings or opposed tapered roller bearings, as desired, and may be clamped at respective ends 22 and 24 by and between members, such as the side plates 26 and 28 of the sheave block assembly, shown in FIG. 1 of the drawings. When the bearings 16 and 18 are thus axially loaded toward each other, they bear axially on respective shoulders 30 and 32 of an internally and inwardly directed annular rib or bearing shoulder means 34 which projects inwardly and internally of the bore 36 of the hollow cylindrical bearing holding member 20. This hollow cylindrical bearing holding member 20 is provided with a radially outwardly extending annular rib 38 having opposed surfaces 40 and 42 adjacent to which respective surfaces 44 and 46 of clamping rings 48 and 50 are disposed. These clamping rings 48 and 50 are clamped together by bolts 52 having heads 54 bearing in an annular recess 56 of the clamping ring 48 and threaded portions 58 of the bolts 54 are screw threaded in the clamping ring 50, all as shown best in FIG. 2 of the drawings. These clamping rings 48 and 50 outwardly beyond their surfaces 44 and 46, which are normal to the axis of the shaft 14, are provided with respective frusto conical surfaces 60 and 62 respectively, which engage conforming outwardly diverging annular frusto conical surfaces of a replaceable sheave member 64. This sheave member 64 is provided with an annular cable engaging groove 66 and peripheral portions 68 and 70 are disposed at opposite sides of the groove 66.

Flange portions 72 and 74 of the clamping rings 48 and 50 extend outward at the outer sides of the sheave member 64 and peripheral portions of the clamping rings 48 and 50 at the flanges 72 and 74 are disposed at substantially a common radius with the peripheral portions 68 and 70 of the replaceable sheave member 64.

The replaceable sheave member 64 is provided with a central opening surrounding the annular ribs 38 of the bearing holding member 20 and outwardly of the rib 38 and inwardly of the frusto conical portions of the sheave member 64 is an inwardly directed annular portion 76 having axially spaced flat surfaces which are engaged by the surfaces 44 and 46 of the clamping rings 48 and 50. The spacing of the opposed surfaces of the portion 76 being equal to the axially spaced portions 40 and 42 of the bearing holder 20. Accordingly, it will be seen that the outwardly projecting portion 38 of the bearing holder 20 is of an axial length substantially equal to the axial length of the portion 76 of the sheave member 64 or equal in length to the spacing of the opposite sides of the portion 76 which are normal to the axis of rotation.

The portion 76 is provided with openings 78 through which the bolts 54 extend, these bolts forcing the clamping rings 48 and 50 together in opposed relationship to each other and in opposed relation to the portion 76 of the sheave member 64 and to the outwardly directed portion 38 of the bearing holder 20.

As shown in FIG. 3, it will be seen that the clamping ring 48 is provided with openings 49 through which the bolts 54 extend and the clamping ring 50 is provided with internally screw threaded openings 51 into which the screw threaded portions 58 of the bolts 54 are engaged.

It will be further noted that the clamping rings 48 and 50 are provided with respective bore portions 80 and 82 which are intimately fitted over the peripheral portions of the bearing holding member 20 at opposite sides of the outwardly projecting or radially extending portion 38.

The bearing holding member may be made of high alloy steel, the clamping rings 48 and 50 may be made of an aluminum alloy, such as Tenzalloy, manufactured by the American Smelting and Refining Company, while the sheave member 64 may be made of a high abrasion resistant plastic, such as Marlex 5000, type 5, manufactured by the Phillips Petroleum Company.

It will be understood that the foregoing materials are preferable, however, other materials may be used, as desired, and it will be obvious that the replaceability of the sheave member 64 is the important factor regardless of the materials of which the parts are made.

The light weight material in the clamping rings 48 and 50 may reduce the moment of inertia of the sheave construction and its overall weight, while the tough plastic or high abrasion resistant material of the sheave member 64 increases the life expectancy of the sheave member 64.

When replacing the worn sheave member 64, the bolts 54 may simply be removed and the clamping rings may be axially removed from the bearing holder 20 and when the parts are replaced with a new sheave member 64, the clamping rings 48 and 50 abut opposite surfaces 40 and 42 of the outwardly projecting portion 38 of the bearing holder 20. Thus, the portion 76 of the sheave member is located and may not be unduly compressed since the portion 38 forms an abutment for the clamping rings 48 and 50. Further, this portion 38 of the bearing holding member 20 forms a central location for the assembly of all of the parts, including the clamping rings 48 and 50 and the sheave member 64. Likewise, the inwardly projecting bearing shoulders 30 and 32 in the bore 36 of the bearing holding member 20 locate the bearings 16 and 18, such that they may be clamped between holding members, such as sheave block side plates or any other devices to precisely locate the sheave assembly of the invention axially with respect to some means for mounting it.

It will be obvious to those skilled in the art that various modifications of the present invention may be resorted to in a manner limited only by a just interpretation of the following claims.

I claim:
1. In a sheave construction the combination of: a hollow cylindrical bearing holding member having a bore adapted to surround bearing means; said bearing holding member having an external outwardly projecting radially disposed portion located intermediate opposite ends of said bearing holding member; a pair of opposite annular clamping rings axially spaced apart; said radially disposed portion located between said clamping rings; an annular-shaped replaceable sheave member having a peripheral portion provided with an annular groove therein; said annular groove adapted to receive a cable or the like; said sheave member having an internal opening therethrough and surrounding said radially disposed portion of said bearing holding member; said sheave member having annular axially spaced opposite surfaces adjacent to which said opposed clamping rings are disposed; and bolts removably fixing said clamping rings together against said axially spaced opposite surfaces of said sheave member; said axially spaced opposite surfaces of said sheave member are disposed adjacent said bearing holding member; said sheave member provided with annular opposed frusto conical portions diverging outwardly from said axially spaced opposite surfaces toward said peripheral portion of said sheave member, said frusto conical surfaces engaged by said clamping rings, said peripheral portion of said sheave member comprises flange portions having ring-shaped outer surfaces normal to the rotating axis of said bearing holding member; said flange portions of said clamping rings at the peripheries thereof, said last mentioned flange portions engaging said ring-shaped outer surfaces.

2. The invention, as defined in claim 1, wherein: said last mentioned flanges having peripheral portions substantially on a common radius with the periphery of said sheave member.

References Cited
UNITED STATES PATENTS 973,177    10/1910    McCready   ---------- 254—193

FOREIGN PATENTS 1,077,940    12/1955    France.

EVON C. BLUNK, *Primary Examiner.*

H. C. HORNSBY, *Examiner.*